March 3, 1964          H. C. PAUL          3,123,410

ENDLESS FLEXIBLE TRACK FOR VEHICLES

Filed May 11, 1961

INVENTOR:
HARRY C. PAUL

United States Patent Office 3,123,410
Patented Mar. 3, 1964

3,123,410
ENDLESS FLEXIBLE TRACK FOR VEHICLES
Harry Charles Paul, 153 Oxford St., Winnipeg 9,
Manitoba, Canada
Filed May 11, 1961, Ser. No. 109,419
2 Claims. (Cl. 305—35)

My invention relates to new and useful improvements in endless tracks for vehicles, particularly vehicles adapted to negotiate snow, ice and mud and the like.

Normally such endless tracks consist of a flexible track spanning a pair of chains and being provided with moulded or separately attached transverse cleats in order to offer some means of traction.

However, I have found that by forming the flexible track in a corrugated pattern while attaching same to the chains, I obtain a track which is eminently satisfactory as far as traction is concerned, gives a shock absorbing action when on hard ground, and is cheaper to produce than moulded track.

The principal object and essence of my invention is therefore to provide a device of the character herewithin described whereby a corrugated track can readily be provided from flat flexible track material.

Another object of my invention is to provide a device of the character herewithin described which provides means to prevent transverse buckling of the flexible track.

Yet another object of my invention is to provide a device of the character herewithin described in which the device forms its own corrugated track in soft snow due to the shape of the endless flexible track.

A yet further object of my invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
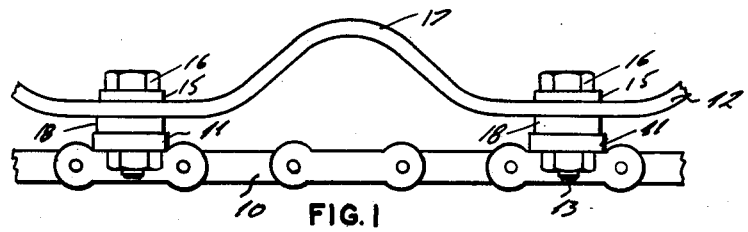
FIGURE 1 is a fragmentary side elevation of my invention.

Proceeding therefore to describe my invention in detail, reference should be made to the accompanying drawings in which reference character 10 illustrates a conventional drive chain. Normally two such chains are provided one upon each side of the vehicle (not illustrated) said chains being maintained in spaced and parallel relationship by the position of the conventional drive and idler sprockets situated on the vehicle.

Figure 2:
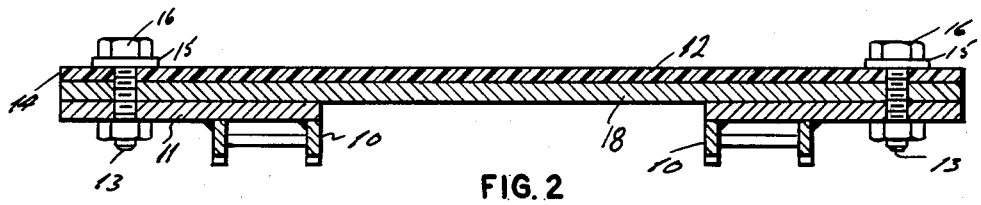
FIGURE 2 is a sectional view at right angles to FIGURE 1 taken through one of the points of attachment to the drive chains.

At regular intervals around these drive chains 10 I have secured a laterally projecting plate 11 as by welding or the like, said plate extending outwardly from the horizontal upper surface of the drive chain link as clearly shown in FIGURE 2.

My endless flexible track 12 is conventional in manufacture and normally consists of a rubberized canvas or the like. It is secured at regular intervals along the length of the drive chains 10 by means of nuts and bolts 13 passing through the flexible track adjacent the edges 14 thereof and through the laterally projecting plates 11 hereinbefore described.

It is, of course, desirable that flat washers 15 be inserted between the bolt heads 16 and the flexible track 12 in order to prevent the flexible track tearing or otherwise weakening at this point.

Figure 3:
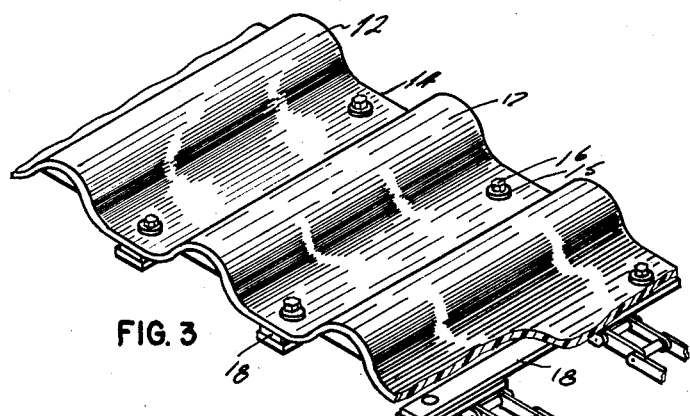
FIGURE 3 is a fragmentary perspective view of the preferred embodiment of my invention.

In attaching the flexible track to the chains transversely as illustrated in FIGURE 3, I corrugate the track as at 17 between adjacent points of attachment by urging the track towards the last point of attachment and causing the portion between adjacent points to curve upwardly from the chains as clearly shown in the drawings, thus forming alternately located outwardly projecting ridges and inwardly positioned depressions relative to the drive chains.

Due to the relative stiffness of such flexible track material, these corrugations are extremely strong and lend good traction and shock absorbing characteristics to the drive assembly.

It is desirable to stiffen the flexible track transversely in order to prevent it buckling between the chains 10 and my preferred method of obtaining this result is to insert a transverse strip 18 between the flexible track 12 and the plates 11. It is desirable that these flexible strips be of spring steel so that they will not deform if rough ground is encountered.

By providing one of these strips at each point of attachment, I obtain an endless track which although flexible along its longitudinal axis, nevertheless is relatively rigid against deformation transversely.

Figure 4:
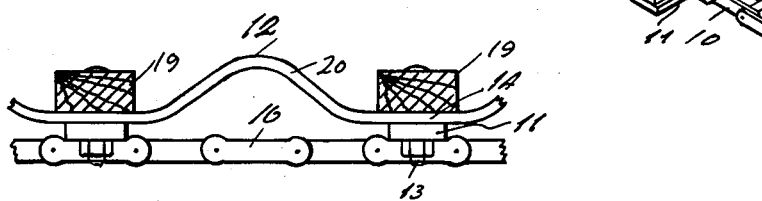
FIGURE 4 is a side elevation reduced in scale with respect to FIGURE 1 showing an alternative embodiment of my invention.

FIGURE 4 shows an alternative embodiment of the device in which the elongated strips 18 have been omitted and wooden cleats 19 substituted therefor. These wooden cleats should be on the external side 20 of the track rather than between the track and the plates 11 and under certain circumstances they not only stiffen the track transversely but also assist in traction.

In operation, the corrugations 17 act as shock absorbers when on hard ground but form their own track in mud or snow thus giving satisfactory traction at a very economical cost.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In an endless track structure, the combination of a pair of transversely spaced parallel chains adapted to travel around sprockets and having radially inward and radially outward edges relative to such sprockets, a set of transversely extending reinforcing strips secured at longitudinally spaced points to the outward edges of said chains, a band of resiliently flexible rubber-like material superposed on said strips longitudinally of the track and having a width at least as great as the transverse spacing of said chains, and means provided at longitudinally spaced points on said band and securing the same to said strips, portions of said band between said securing means having a greater longitudinal dimension than the longitudinal spacing of said strips on said chains and said portions of said band being bowed outwardly from said chains to provide resiliently yieldable ground engaging elements.

2. The structure as defined in claim 1 together with pairs of laterally projecting brackets secured to said chains, said strips being superposed on and secured to said brackets.

References Cited in the file of this patent
UNITED STATES PATENTS

| | | |
|---|---|---|
| 711,587 | Ober | Oct. 21, 1902 |
| 1,319,120 | Schutz | Oct. 21, 1919 |
| 1,400,218 | Howe | Dec. 13, 1921 |
| 2,323,526 | Eliason | July 6, 1943 |